Jan. 20, 1953     T. O. MONTERO     2,625,907
COW STANCHION
Filed March 23, 1951     2 SHEETS—SHEET 1
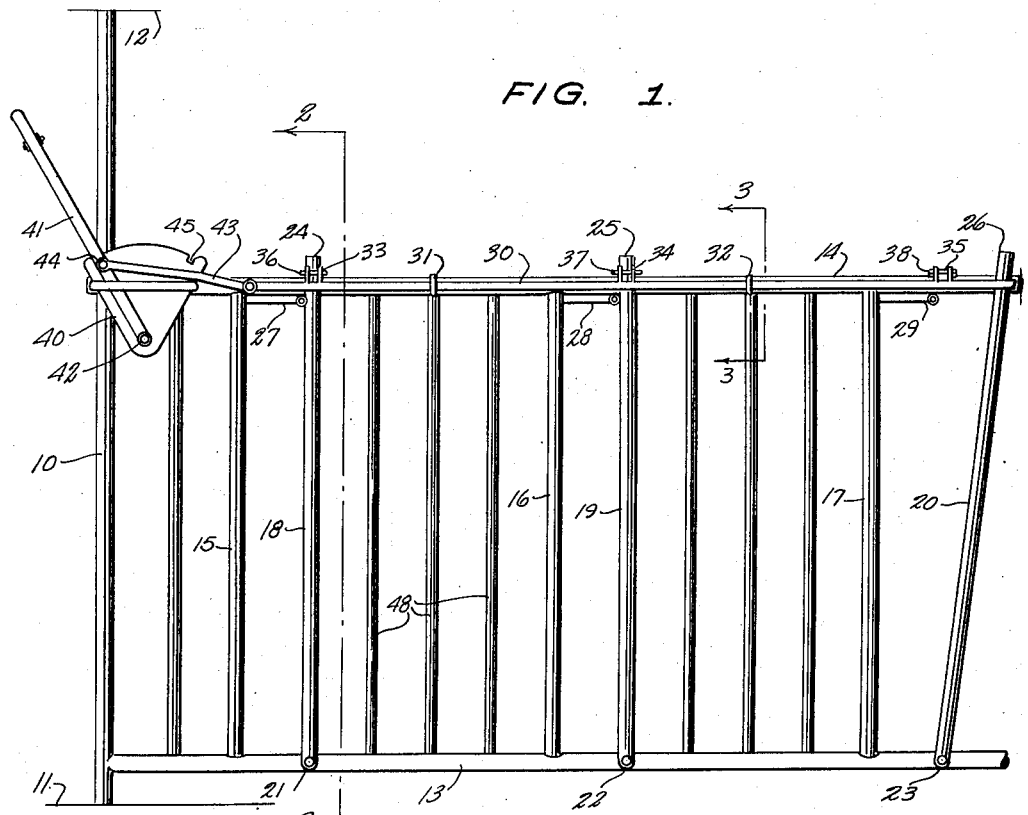
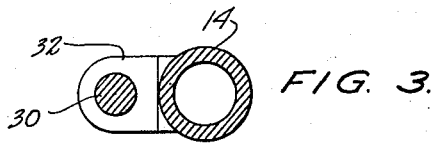
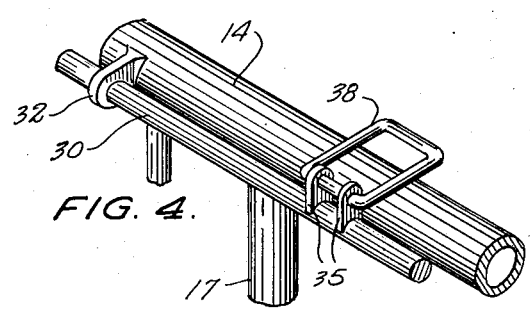
INVENTOR.
TONY O. MONTERO,
BY
McMorrow, Berman + Davidson
ATTORNEYS.

Jan. 20, 1953  T. O. MONTERO  2,625,907
COW STANCHION
Filed March 23, 1951  2 SHEETS—SHEET 2
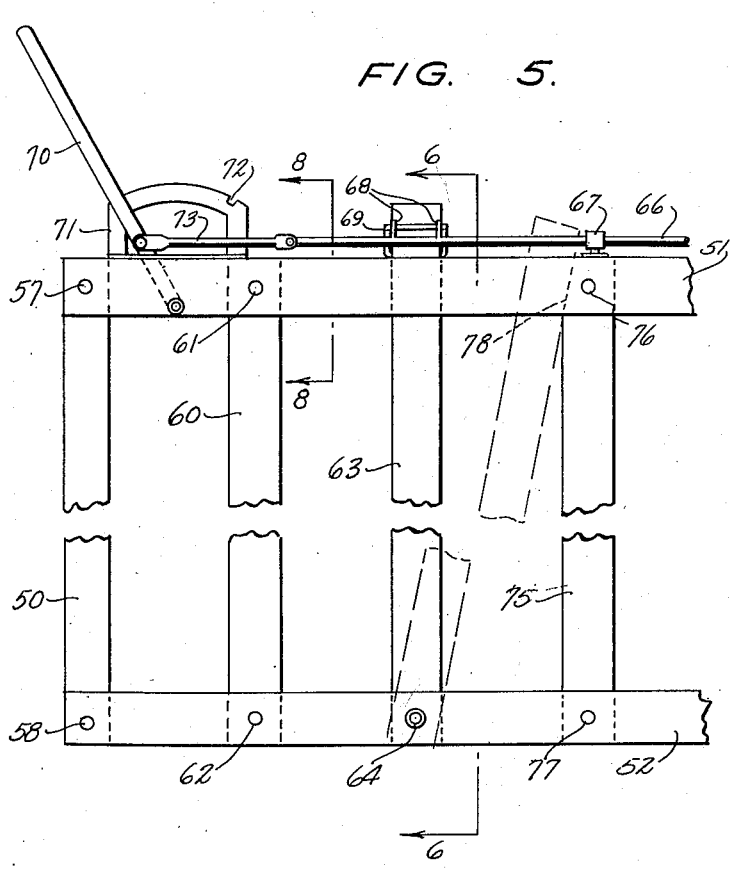
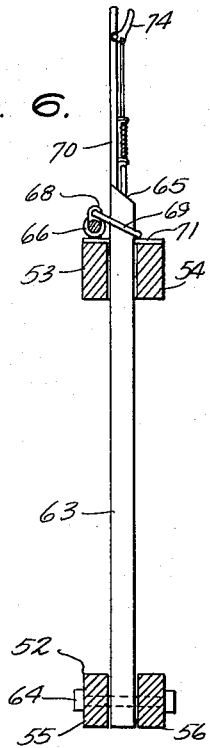
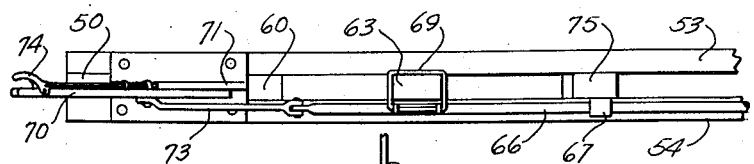
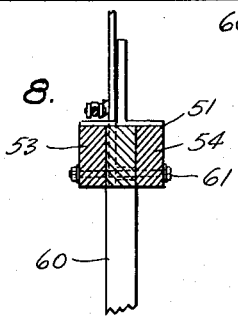
INVENTOR.
TONY O. MONTERO,
BY
McMorrow, Berman + Davidson
ATTORNEYS.

Patented Jan. 20, 1953

2,625,907

UNITED STATES PATENT OFFICE 2,625,907

COW STANCHION

Tony O. Montero, Loomis, Calif.

Application March 23, 1951, Serial No. 217,240

1 Claim. (Cl. 119—148)

This invention relates to cattle stanchions disposed in dairy barns and cattle feeding barns or sheds, and more particularly to a stanchion gang in which the individual stanchions are simultaneously opened and closed by a single operating lever.

It is among the objects of the invention to provide an improved stanchion assembly including a plurality of individual structures mounted on common supports and operated by a single lever, so that all of the stanchions can be simultaneously opened and closed; which firmly restrains cattle secured therein; which provides means for releasing individual stanchions after the gang of stanchions has been closed; and which is simple, strong and durable in construction, economical to manufacture from readily available materials, and easy to install and use.

Other objects and advantages will become apparent from a consideration of the following description and the appended claim in conjunction with the accompanying drawings, wherein:

Figure 1 is a front elevational view of a stanchion assembly illustrative of the invention;

Figure 2 is a cross-sectional view on the line 2—2 of Figure 1;

Figure 3 is a fragmentary cross-sectional view on an enlarged scale on the line 3—3 of Figure 1;

Figure 4 is a perspective view of a fragmentary portion of the stanchion assembly illustrating structural details thereof;

Figure 5 is a front elevational view of a fragmentary portion of a modified stanchion assembly;

Figure 6 is a cross-sectional view on the line 6—6 of Figure 5;

Figure 7 is a top plan view of the fragmentary stanchion assembly illustrated in Figure 5; and Figure 8 is a fragmentary cross-sectional view on the line 8—8 of Figure 5.

With continued reference to the drawings, the stanchion assembly illustrated in Figures 1 to 4, inclusive, is formed of metal tubing, such as ordinary iron pipe, the pieces being welded together to provide the stanchion assembly, and the form of the invention shown in Figures 5 to 8, inclusive, is made of wooden members secured together by bolts or other suitable fasteners. While the metal and wooden assemblies are somewhat different in structural details, both operate on the same principle and accomplish the desired result in substantially the same manner.

The assembly illustrated in Figures 1 to 4, inclusive, comprises a pair of end posts, one of which is illustrated in Figure 1 and designated at 10. This end post is a length of metal pipe of suitable diameter and extends from the floor 11 of the building to an overhead support 12, such as a ceiling joist, beam or roof member, so that the end posts are firmly supported in substantially vertical position in the building.

A bottom rail 13 also formed of a metal tube or pipe of suitable diameter extends between the two end posts and is disposed a predetermined distance above the floor 11 and substantially perpendicular to the end posts, so that it is substantially horizontal and substantially parallel to the floor of the building. An upper rail 14 extends between the end posts at a predetermined distance above the bottom rail 13, and this top rail is substantially parallel to the bottom rail and perpendicular to the end posts. The top and bottom rails are securely welded at their ends to the end posts to provide a rigid structure.

Stanchions are disposed at uniformly spaced apart intervals between the top and bottom rails, three such stanchions being illustrated in Figure 1 of the drawings.

Each stanchion comprises a fixed member and a movable member, the fixed members of the three stanchions illustrated in Figure 1 being designated at 15, 16 and 17, and the movable members at 18, 19 and 20. The fixed and movable members are also suitable lengths of metal tubing of appropriate diameter extending between the top and bottom rails 14 and 13 of the structure. The fixed members are securely welded at their ends to the top and bottom rails and are substantially parallel to the end posts of the structure. Adjacent fixed members are spaced apart a predetermined, uniform distance, and the fixed member 15 adjacent the end post 10 is spaced from the end post a distance substantially one-half the distance between the fixed and movable members of adjacent stanchions. Each of the movable stanchion members is provided at its lower end with a bifurcated formation providing a pair of spaced apart, apertured lugs, which bifurcated formations straddle the bottom rail 13 of the structure. The bottom rail is provided with transverse apertures at properly spaced apart locations therealong, and pivot pins or bolts, as indicated at 21, 22 and 23, pivotally connect the lower ends of the movable stanchion members 18, 19 and 20 to the bottom rail 13 at a predetermined, uniform distance from the bottom ends of the associated fixed stanchion members 15, 16 and 17.

At their upper ends the movable stanchion members are provided with upwardly projecting loops, as indicated at 24, 25 and 26, preferably formed of suitable strap metal and of U-shaped construction, the legs of each loop being welded at the open end of the loop to the corresponding movable stanchion member at the upper end of the latter, and extending around the top rail 14 to guide the upper ends of the movable stanchion members along the top rail in the movements of the movable stanchion members toward and away from the corresponding fixed members.

Stops, as indicated at 27, 28 and 29 are secured to the under side of the top rail 14 and disposed one between the fixed and the movable member of each stanchion. These stops are preferably in the form of elongated blocks of metal or wood, and are arranged to limit movement of the upper end of each movable stanchion member toward the upper end of the corresponding fixed stanchion member to a distance from the upper end of the fixed member substantially equal to the distance between the lower ends of the corresponding fixed and movable stanchion members.

A rod 30 extends along the top rail 14 and is supported in apertured guides, as indicated at 31 and 32, secured to the top rail and projecting outwardly therefrom. Apertured lugs, as indicated at 33, 34 and 35, project upwardly from the rod 30 at spaced apart intervals therealong corresponding to the spacing between the upper ends of the movable stanchion members 18, 19 and 20 when these members are all in closed position. The lugs are preferably arranged in closely spaced pairs and rectangular loops or rings, as indicated at 36, 37 and 38 are pivotally secured one to each pair of lugs by having one side of the ring extending through the apertures in the lugs, as particularly illustrated in Figure 4.

The guide loops on the upper ends of the movable stanchion members project above the top rail 14 of the structure and have tapered upper ends to facilitate placing the corresponding rings over the upper ends of these guide loops and removing the rings therefrom.

For simultaneous operation of all of the movable stanchion members, the corresponding rings are placed over the upper ends of the guide loops on the movable stanchion members so that the movable members will be moved toward and away from the corresponding fixed members when the rod 30 is moved longitudinally relative to the top rail 14 of the structure. When it is desired to release any individual movable member to open the corresponding stanchion, the ring is simply lifted off of the corresponding guide loop, thereby freeing the upper end of the movable stanchion member so that this movable member can be moved away from the associated fixed member to open the stanchion, as illustrated by the stanchion members 17 and 20 at the right-hand side of Figure 1.

A metal plate 40 of substantially triangular shape and having a curved base edge is mounted in inverted position on the structure at the end of the top rail 14 adjacent the end post 10, and a hand lever 41 is pivotally connected at one end to this plate near the downwardly disposed apex portion of the plate by a pivot pin 42. A link 43 is pivotally connected at one end to the lever 41 intermediate the length of the lever and is pivotally connected at its other end to the end of the rod 30 adjacent the hand lever, so that movement of the lever about the pivot pin 42 will move the rod longitudinally of the top rail 14 of the structure to simultaneously open and close the several stanchions provided. The plate 40 is provided near the opposite ends of its curved upper edge with locking notches 44 and 45, and the lever 41 is provided with a spring biased detent 46 which engages in the notches 44 and 45 to lock the rod 30 in either its stanchion-opened or stanchion-closed position, this detent being released from the notches by a hand grip lever 47 mounted on the hand lever 41 to free the hand lever for movement of the rod between its stanchion-opening and stanchion-closing positions.

Pickets 48 in the form of lengths of iron tubing of smaller diameter than the diameter of the fixed and movable stanchion members extend between the top and bottom rails between adjacent stanchions and between the end stanchions and the adjacent end posts to close the spaces between the stanchions and the spaces between the end stanchions and the adjacent end posts. These pickets are preferably disposed perpendicular to the top and bottom rails and substantially parallel to the end rails and are preferably spaced apart a distance such that the animals cannot put their heads through the spaces between the stanchions, but are constrained to put their heads between the fixed and movable members of the stanchions in order to obtain feed from the manger disposed at the front side of the stanchion assembly.

In the arrangement illustrated in Figures 5 to 8, inclusive, the end posts, as designated at 50, comprise wooden members of elongated, rectangular cross-sectional shape secured in substantially vertical position in the building, and the top and bottom rails 51 and 52 each comprise two wooden members of elongated, rectangular cross-sectional shape disposed parallel to each other and spaced apart a distance substantially equal to the thickness of the end posts, the two members of the top rail 51 being designated at 53 and 54 in Figures 6 and 8, and the two members of the bottom rail 52 being designated at 55 and 56 in Figure 6.

The end posts are received between the members 53 and 54 of the top rail at the opposite ends of the top rail, and the top rail members are secured to the end posts by suitable fasteners, such as the bolt 57 and the end posts are also received between the members 55 and 56 of the bottom rail at the opposite ends of the bottom rail, and the bottom rail members are secured to the end posts by suitable fasteners, such as the bolt 58.

Fixed stanchion members, as designated at 60, extend between the top and bottom rails at predetermined intervals along these rails, and have their upper ends disposed between the two members of the upper rail and secured to the upper rail by bolts, as designated at 61, and their lower ends disposed between the two members of the bottom rail and secured to the bottom rail by bolts, as designated at 62. These fixed stanchion members are substantially parallel to the end posts and substantially perpendicular to the top and bottom rails, these rails being disposed in vertically spaced apart and substantially parallel relationship to each other.

The movable stanchion rails, as designated at 63, have their lower ends received between the two members of the bottom rail at a predetermined distance from the lower ends of the corresponding fixed stanchion members, the lower ends of the movable members being pivotally connected to the bottom rail by suitable bolts or pivot pins, as indicated at 64. At their upper ends the movable stanchion members extend freely between the two members 53 and 54 of the top rails and project above the top rails, as is particularly illustrated in Figures 5 and 6, and are provided with beveled upper end surfaces, as indicated at 65.

A rod 66 extends along the top of the top rail 51 and is guided in suitable supports 67 secured to the upper side of the top rail at spaced apart locations therealong, these supports being in the form of T-fittings with apertured flanges at the outer ends of their stems for attachment of the supports to the top rail of the structure.

Apertured lugs, as indicated at 68, extend upwardly from the rod 66 at spaced apart intervals therealong, these lugs preferably being arranged in spaced apart pairs, and rectangular loops or rings 69 are pivotally secured one to each pair of lugs 68 by having one side of each ring extending through the apertures in the corresponding pair of lugs.

The rings 69 receive the upper end portions of the corresponding movable stanchion members 63 projecting above the top rail 51, and may be lifted off of the upper ends of the corresponding movable stanchion members to free these members for individual movement, when desired.

A hand lever 70 is pivotally mounted at one end on the top rail 51 near one end of the latter, and a quadrant 71 having an arcuately curved upper edge and locking notches, as indicated at 72, disposed one near each end of its curved upper edge, is mounted on the top rail adjacent the lever 70. A link 73 is pivotally connected at one end to the hand lever 70 intermediate the length of the hand lever and is pivotally connected at its other end to the end of the rod 66 adjacent the hand lever, and a spring biased detent is mounted on the hand lever and engages in the locking notches in the quadrant 71 to lock the lever in stanchion closing and stanchion opening positions of the rod 66. The detent is moved out of the notches by a suitable hand grip lever 74 to free the hand lever for movement of the rod between its stanchion closing and stanchion opening position.

Pickets, as indicated at 75, are disposed between adjacent stanchions and extend between the top and bottom rails 51 and 52 of the structure substantially parallel to the end posts 50. The upper and lower ends of these pickets are disposed between the spaced apart members of the upper and lower rails and the pickets are secured to the upper rails by suitable fasteners, as indicated at 76 and 77. These pickets are so spaced as to prevent animals from putting their heads through the spaces between adjacent stanchions, and the pickets adjacent the movable stanchion members are preferably beveled at the upper ends of their sides opposed to the movable members, as indicated at 78, to increase the distance between the upper ends of the fixed and movable stanchion members when the stanchions are open, as indicated in broken lines in Figure 5.

With the form of the invention illustrated in Figures 5 to 8, inclusive, the stanchions may be simultaneously opened and closed by operation of the hand lever 70 and locked in either their open or closed position, and individual stanchions can be manually opened to release some of the animals without releasing the others, as explained above in connection with the form of the invention illustrated in Figures 1 to 4, inclusive. All of the stanchions can be quickly opened and closed with a very small amount of manual effort, thus greatly facilitating the handling of the cattle in dairying and feeding operations.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A cattle stanchion assembly comprising end posts adapted to be fixedly mounted in substantially vertical positions and in spaced apart relationship to each other, an upper and a lower side rail extending between said posts in spaced apart substantially parallel relationship to each other, stanchions disposed between said upper and lower rails in spaced apart relationship to each other and each comprising a fixed member substantially parallel to said end posts, a movable member pivotally connected at its lower end to said lower rail at a location spaced a predetermined distance from the lower end of the associated fixed member and guided at its upper end on said upper rail for movement toward and away from the corresponding fixed member and a stop carried by said upper rail and disposed between said fixed and movable members to limit movements of said movable member toward said fixed member to a predetermined distance between said members, a rod extending along said upper rail, manually operated means connected between one end of said rod and said upper rail near one end of the latter for moving said rod along said upper rail to open and close said stanchions and for releasably locking said rod to said upper rail in position to maintain stanchions closed, pickets disposed between adjacent stanchions and extending between said upper and lower rails to close the spaces between the stanchions, and loops secured one to each movable stanchion member at the upper end of the latter and projecting upwardly from the corresponding movable stanchion members and receiving said upper rail to guide the upper ends of said movable stanchion members along said upper rail toward and away from the upper ends of the corresponding fixed stanchion members, apertured lugs projecting outwardly from said rod at spaced apart locations therealong, and rings of rectangular shape pivotally connected to said rod by said lugs and receiving the upper ends of said loops, said rings being manually removable from the upper ends of the associated loops to release the corresponding movable stanchion members individually for opening the stanchions.

TONY O. MONTERO.

REFERENCES CITED

The following references are of record in the file of this patent:

UNITED STATES PATENTS

| Number | Name | Date |
|---|---|---|
| 715,843 | McLennan | Dec. 16, 1902 |
| 722,271 | Anderson | Mar. 10, 1903 |
| 1,072,352 | Neller | Sept. 2, 1913 |
| 1,081,045 | James | Dec. 9, 1913 |
| 1,203,009 | Kensbrock | Oct. 31, 1916 |